United States Patent
Hosseini et al.

(10) Patent No.: US 11,705,998 B2
(45) Date of Patent: *Jul. 18, 2023

(54) REPETITION-BASED TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Chih-Ping Li, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,255

(22) Filed: Dec. 28, 2021

(65) Prior Publication Data

US 2022/0123870 A1  Apr. 21, 2022

Related U.S. Application Data

(63) Continuation of application No. 16/352,568, filed on Mar. 13, 2019, now Pat. No. 11,245,497.

(Continued)

(51) Int. Cl.
*H04L 1/1867* (2023.01)
*H04L 1/08* (2006.01)
*H04W 72/23* (2023.01)

(52) U.S. Cl.
CPC ............... *H04L 1/189* (2013.01); *H04L 1/08* (2013.01); *H04L 1/1883* (2013.01); *H04W 72/23* (2023.01)

(58) Field of Classification Search
CPC ......... H04L 1/08; H04L 1/189; H04L 1/1819; H04L 1/1883
See application file for complete search history.

(56) References Cited

U.S. PATENT DOCUMENTS 9,992,004 B2   6/2018  Mallik et al.
11,245,497 B2*  2/2022  Hosseini ............... H04L 1/1883
(Continued)

FOREIGN PATENT DOCUMENTS

CN        102224701 A    10/2011
EP          3282618 A1    2/2018
WO      WO-2016126330    8/2016

OTHER PUBLICATIONS

International Preliminary Report on Patentability—PCT/US2019/022228, The International Bureau of WIPO—Geneva, Switzerland, dated Oct. 1, 2020 (182586WO).

(Continued)

*Primary Examiner* — Elton Williams
(74) *Attorney, Agent, or Firm* — QUALCOMM Incorporated

(57) ABSTRACT

Methods, systems, and devices for wireless communications are described. In some wireless communications systems, a transmitting device may be configured to transmit a transport block in a set of transmission time intervals (TTIs) of a repetition window to improve the chances that the transport block is received by a receiving device. In some cases, however, the transport block may not be available to be transmitted in the repetition window until after a first TTI of the repetition window. In such cases, a transmitting device may use the techniques described herein to identify appropriate configurations for transmitting the transport block in the repetition window. For example, the transmitting device may identify an adjusted redundancy version sequence to use for transmitting the transport block in the repetition window or the transmitting device may adjust a repetition window based on a TTI in which the transport block is available to be transmitted.

30 Claims, 12 Drawing Sheets

Related U.S. Application Data

(60) Provisional application No. 62/644,324, filed on Mar. 16, 2018.

(56) References Cited

U.S. PATENT DOCUMENTS

| | | |
|---|---|---|
| 2015/0341956 A1 | 11/2015 | Sun et al. |
| 2017/0034740 A1 | 2/2017 | Rico et al. |
| 2017/0265168 A1 | 9/2017 | Wang et al. |
| 2017/0265193 A1 | 9/2017 | Wang et al. |
| 2018/0375616 A1 | 12/2018 | Beale et al. |
| 2019/0288800 A1 | 9/2019 | Hosseini et al. |
| 2019/0363833 A1 | 11/2019 | Wang et al. |
| 2020/0195389 A1 | 6/2020 | Basu Mallick et al. |

OTHER PUBLICATIONS

International Search Report and Written Opinion—PCT/US2019/022228—ISA/EPO—dated Jun. 17, 2019 (182586WO).

\* cited by examiner

REPETITION-BASED TRANSMISSIONS

CROSS REFERENCES

The present Application for Patent is a Continuation of U.S. patent application Ser. No. 16/352,568 by Hosseini et al., entitled "Repetition-Based Transmissions" filed Mar. 13, 2019, which claims the benefit of U.S. Provisional Patent Application No. 62/644,324 by Hosseini, et al., entitled "Repetition-Based Transmissions," filed Mar. 16, 2018, assigned to the assignee hereof, and expressly incorporated by reference herein.

BACKGROUND

The following relates generally to wireless communication and more specifically to repetition-based transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a transmitting device (e.g., a base station or a UE) may be configured to transmit a transport block in a set of transmission time intervals (TTIs) of a repetition window to improve the chances that the transport block is received by a receiving device. In some cases, however, it may be challenging for the transmitting device to identify appropriate configurations for transmitting the transport block within the repetition window.

SUMMARY

In some wireless communications systems, a transmitting device may be configured to transmit a transport block in a set of transmission time intervals (TTIs) of a repetition window to improve the chances that the transport block is received by a receiving device. In some cases, however, the transport block may not be available to be transmitted in the repetition window until after a first TTI of the repetition window. In such cases, the transmitting device may use the techniques described herein to identify appropriate configurations for transmitting the transport block in the repetition window. For example, the transmitting device may identify an adjusted redundancy version sequence to use for transmitting the transport block in the repetition window or the transmitting device may adjust a repetition window based on a TTI in which the transport block is available to be transmitted.

A method for wireless communication is described. The method may include identifying that a wireless device is configured for repetition-based transmission of a transport block within a repetition window, the repetition window including a first TTI and subsequent TTIs and being associated with a first redundancy version sequence, determining that the transport block is available for initial transmission in one of the subsequent TTIs of the repetition window, determining a second redundancy version sequence for transmitting the transport block within the repetition window based at least in part on the transport block being available for initial transmission in one of the subsequent TTIs, and transmitting the transport block within the repetition window in accordance with the second redundancy version sequence.

An apparatus for wireless communication is described. The apparatus may include means for identifying that a wireless device is configured for repetition-based transmission of a transport block within a repetition window, the repetition window including a first TTI and subsequent TTIs and being associated with a first redundancy version sequence, means for determining that the transport block is available for initial transmission in one of the subsequent TTIs of the repetition window, means for determining a second redundancy version sequence for transmitting the transport block within the repetition window based at least in part on the transport block being available for initial transmission in one of the subsequent TTIs, and means for transmitting the transport block within the repetition window in accordance with the second redundancy version sequence.

Another apparatus for wireless communication is described. The apparatus may include a processor, memory in electronic communication with the processor, and instructions stored in the memory. The instructions may be operable to cause the processor to identify that a wireless device is configured for repetition-based transmission of a transport block within a repetition window, the repetition window including a first TTI and subsequent TTIs and being associated with a first redundancy version sequence, determine that the transport block is available for initial transmission in one of the subsequent TTIs of the repetition window, determine a second redundancy version sequence for transmitting the transport block within the repetition window based at least in part on the transport block being available for initial transmission in one of the subsequent TTIs, and transmit the transport block within the repetition window in accordance with the second redundancy version sequence.

A non-transitory computer-readable medium for wireless communication is described. The non-transitory computer-readable medium may include instructions operable to cause a processor to identify that a wireless device is configured for repetition-based transmission of a transport block within a repetition window, the repetition window including a first TTI and subsequent TTIs and being associated with a first redundancy version sequence, determine that the transport block is available for initial transmission in one of the subsequent TTIs of the repetition window, determine a second redundancy version sequence for transmitting the transport block within the repetition window based at least in part on the transport block being available for initial transmission in one of the subsequent TTIs, and transmit the transport block within the repetition window in accordance with the second redundancy version sequence.

In some examples of the method, apparatus, and non-transitory computer-readable medium described above, determining the second redundancy version sequence includes identifying that the second redundancy version sequence may be the same as a first portion of the first redundancy version sequence, where the second redundancy version sequence ends with a same TTI as the first redundancy version sequence. In some examples of the method, apparatus, and non-transitory computer-readable medium described above, determining the second redundancy version sequence includes identifying that the second redundancy version sequence may be the same as a last portion of the first redundancy version sequence, where a first value in the second redundancy version sequence includes either a zero value or a non-zero value, and where the second redundancy version sequence ends with a same TTI as the first redundancy version sequence.

In some examples of the method, apparatus, and non-transitory computer-readable medium described above, the second redundancy version sequence may be based at least in part on an index of the one of the subsequent TTIs in which the transport block may be available to be initially transmitted. In some examples of the method, apparatus, and non-transitory computer-readable medium described above, determining the second redundancy version sequence includes receiving an indication of the second redundancy version sequence. In some examples of the method, apparatus, and non-transitory computer-readable medium described above, the indication of the second redundancy version sequence may be received in a radio resource control (RRC) message or a downlink control information (DCI) message.

In some examples of the method, apparatus, and non-transitory computer-readable medium described above, the transport block may be transmitted in the one of the subsequent TTIs of the repetition window in which the transport block may be available to be initially transmitted regardless of a value in the first redundancy version sequence corresponding to the one of the subsequent TTIs of the repetition window. In some examples of the method, apparatus, and non-transitory computer-readable medium described above, the repetition window includes a fixed or preconfigured repetition window.

Some examples of the method, apparatus, and non-transitory computer-readable medium described above may further include processes, features, means, or instructions for identifying a same set of resources for transmitting the transport block in each TTI of the repetition window and transmitting the transport block within the repetition window on the identified resources. Some examples of the method, apparatus, and non-transitory computer-readable medium described above may further include processes, features, means, or instructions for identifying a first set of resources for transmitting the transport block in one TTI of the repetition window, identifying a second set of resources for transmitting the transport block in another TTI of the repetition window, and transmitting the transport block within the repetition window on the identified resources. Some examples of the method, apparatus, and non-transitory computer-readable medium described above may further include processes, features, means, or instructions for receiving an indication of resources for transmitting the transport block within the repetition window.

In some examples of the method, apparatus, and non-transitory computer-readable medium described above, receiving the indication of the resources for transmitting the transport block within the repetition window includes receiving an indication of resources allocated for the initial transmission of the transport block within the repetition window. Some examples of the method, apparatus, and non-transitory computer-readable medium described above may further include processes, features, means, or instructions for determining the resources for a subsequent transmission of the transport block within the repetition window based at least in part on the resources allocated for the initial transmission of the transport block within the repetition window.

In some examples of the method, apparatus, and non-transitory computer-readable medium described above, determining the resources for the subsequent transmission of the transport block includes determining the resources for the subsequent transmission of the transport block based on an index of a TTI in which the initial transmission of the transport block occurs within the repetition window. In some examples of the method, apparatus, and non-transitory computer-readable medium described above, the determining the resources for the subsequent transmission of the transport block may be further based at least in part on an index of a TTI in which the subsequent transmission occurs within the repetition window or on an index of the subsequent transmission in a series of repetition-based transmissions.

In some examples of the method, apparatus, and non-transitory computer-readable medium described above, the indication of the resources for transmitting the transport block within the repetition window may be received in a radio resource control (RRC) message or a DCI message. In some examples of the method, apparatus, and non-transitory computer-readable medium described above, the transport block may be transmitted within the repetition window according to a frequency hopping pattern. Some examples of the method, apparatus, and non-transitory computer-readable medium described above may further include processes, features, means, or instructions for determining whether the frequency hopping pattern may be configured for transmissions of the transport block within the repetition window based at least in part on a length of the repetition window.

A method for wireless communication is described. The method may include identifying that a transport block is configured for repetition-based transmission, identifying a TTI in which the transport block is available to be initially transmitted, adjusting a sliding repetition window to include the TTI as an initial TTI for the sliding repetition window so that the transport block is initially transmitted in the TTI, the sliding repetition window having an associated redundancy version sequence, and transmitting the transport block within the sliding repetition window in accordance with the associated redundancy version sequence.

An apparatus for wireless communication is described. The apparatus may include means for identifying that a transport block is configured for repetition-based transmission, means for identifying a TTI in which the transport block is available to be initially transmitted, means for adjusting a sliding repetition window to include the TTI as an initial TTI for the sliding repetition window so that the transport block is initially transmitted in the TTI, the sliding repetition window having an associated redundancy version sequence, and means for transmitting the transport block within the sliding repetition window in accordance with the associated redundancy version sequence.

Another apparatus for wireless communication is described. The apparatus may include a processor, memory in electronic communication with the processor, and instructions stored in the memory. The instructions may be operable to cause the processor to identify that a transport block is configured for repetition-based transmission, identify a TTI in which the transport block is available to be initially transmitted, adjust a sliding repetition window to include the TTI as an initial TTI for the sliding repetition window so that the transport block is initially transmitted in the TTI, the sliding repetition window having an associated redundancy version sequence, and transmit the transport block within the sliding repetition window in accordance with the associated redundancy version sequence.

A non-transitory computer-readable medium for wireless communication is described. The non-transitory computer-readable medium may include instructions operable to cause a processor to identify that a transport block is configured for repetition-based transmission, identify a TTI in which the transport block is available to be initially transmitted, adjust a sliding repetition window to include the TTI as an initial TTI for the sliding repetition window so that the transport block is initially transmitted in the TTI, the sliding repetition window having an associated redundancy version sequence, and transmit the transport block within the sliding repetition window in accordance with the associated redundancy version sequence.

Some examples of the method, apparatus, and non-transitory computer-readable medium described above may further include processes, features, means, or instructions for identifying a same set of resources for transmitting the transport block in each TTI of the sliding repetition window and transmitting the transport block within the sliding repetition window on the identified resources. Some examples of the method, apparatus, and non-transitory computer-readable medium described above may further include processes, features, means, or instructions for identifying a first set of resources for transmitting the transport block in one TTI of the sliding repetition window, identifying a second set of resources for transmitting the transport block in another TTI of the sliding repetition window, and transmitting the transport block within the sliding repetition window on the identified resources. Some examples of the method, apparatus, and non-transitory computer-readable medium described above may further include processes, features, means, or instructions for receiving an indication of resources for transmitting the transport block within the sliding repetition window.

In some examples of the method, apparatus, and non-transitory computer-readable medium described above, receiving the indication of the resources for transmitting the transport block within the sliding repetition window includes receiving an indication of the resources for an initial transmission of the transport block within the sliding repetition window. Some examples of the method, apparatus, and non-transitory computer-readable medium described above may further include processes, features, means, or instructions for determining the resources for a subsequent transmission of the transport block within the sliding repetition window based at least in part on the resources allocated for the initial transmission of the transport block within the sliding repetition window.

In some examples of the method, apparatus, and non-transitory computer-readable medium described above, determining the resources for the subsequent transmission of the transport block includes determining the resources for the subsequent transmission of the transport block based on an index of a TTI allocated for the initial transmission of the transport block within the repetition window. In some examples of the method, apparatus, and non-transitory computer-readable medium described above, the determining the resources for the subsequent transmission of the transport block may be further based at least in part on an index of a TTI allocated for the subsequent transmission within the sliding repetition window or on an index of the subsequent transmission.

In some examples of the method, apparatus, and non-transitory computer-readable medium described above, the indication of the resources for transmitting the transport block within the sliding repetition window may be received in an RRC message or a DCI message. In some examples of the method, apparatus, and non-transitory computer-readable medium described above, the transport block may be transmitted within the sliding repetition window according to a frequency hopping pattern.

DETAILED DESCRIPTION

Figure 1:
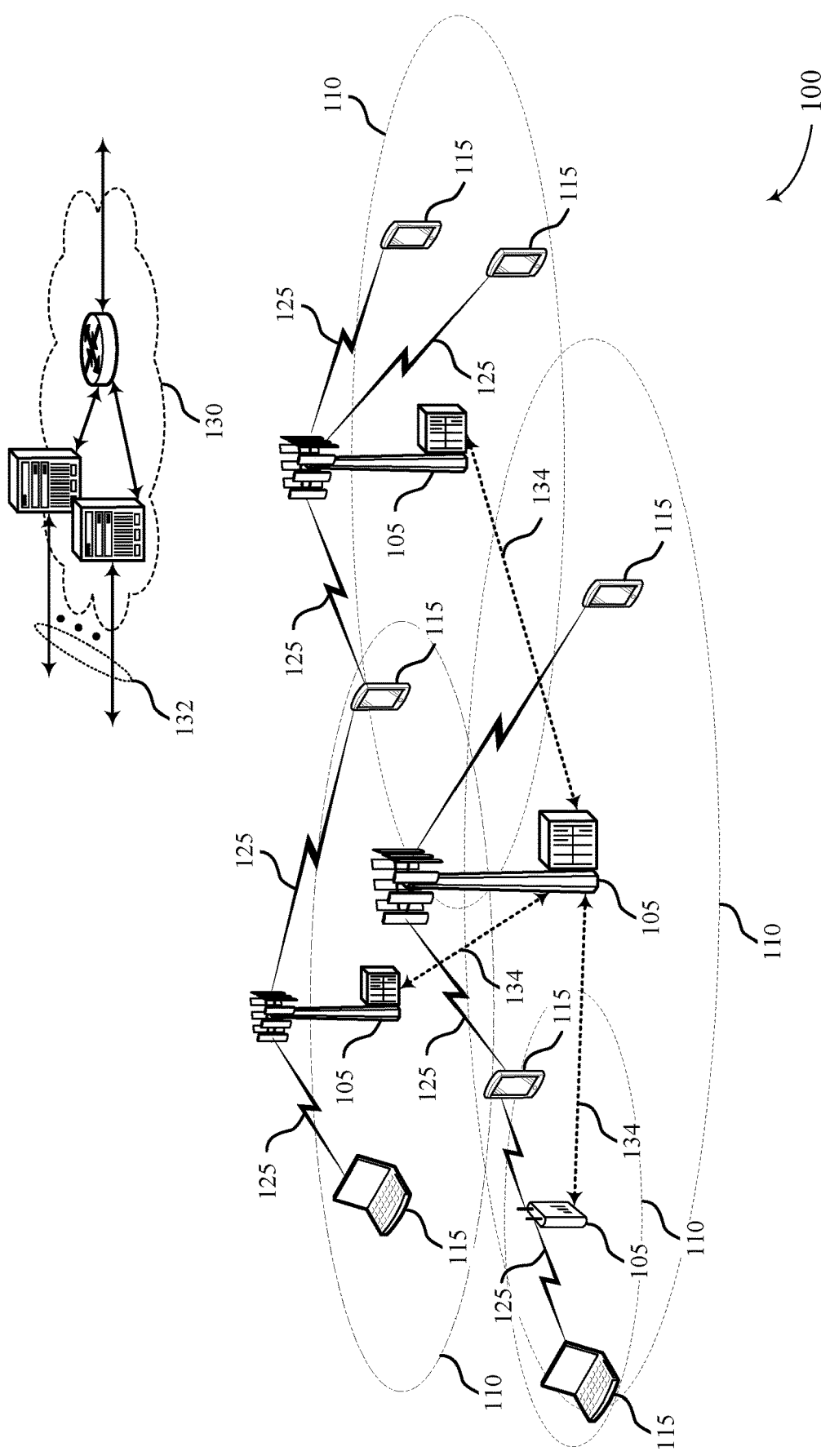
FIGS. 1 and 2 illustrate examples of wireless communications systems that support repetition-based transmissions in accordance with aspects of the present disclosure.

Some wireless communications systems may support repetition-based transmissions of a transport block in a repetition window to increase the chances that the transport block is received by a receiving device. The repetition window may be associated with a redundancy version sequence that indicates the redundancy version of the transport block to be transmitted in each transmission time interval (TTI) of the repetition window. In some systems, when a transmitting device is configured for repetition-based transmissions of a transport block, the transport block may only be initially transmitted in a TTI of a repetition window if the redundancy version corresponding to that TTI is zero (i.e., the transport block may only be initially transmitted with a redundancy version of zero). As such, the first value in redundancy version sequences used for repetition-based transmissions may be zero.

In some cases, however, a transport block may not be available for transmission until after a first TTI of a repetition window (e.g., the transport block may not be received from higher layers by lower layers for transmission until after a first TTI of a repetition window). In such cases, if the redundancy version value corresponding to the TTI in which the transport block is available for transmission is not zero, a transmitting device may avoid transmitting the transport block in that TTI of the repetition window. Instead, the transmitting device may transmit the transport block in a subsequent TTI of the repetition window with a corresponding redundancy version value that is equal to zero. As a result, the latency associated with transmissions of a transport block in a repetition window may increase when the transport block is not available for transmission in a first TTI of a repetition window. Further, the chances that the transport block is received by a receiving device may decrease when the transport block is not available for transmission in a first TTI of a repetition window, since the transmitting device may miss one or more transmission opportunities in the repetition window.

As described herein, a wireless communications system may support efficient techniques for limiting the latency and increasing the reliability associated with repetition-based transmissions. In particular, when a transmitting device identifies that a transport block is available for transmission in a TTI subsequent to a first TTI of a repetition window, the transmitting device may transmit the transport block in the TTI in which the transport block is available for transmission regardless of whether a redundancy version value corresponding to the TTI is equal to zero (e.g., the redundancy version sequence may be specified by the first transmission). As a result, the latency associated with transmitting the transport block may be reduced and the chances that the transport block is received by a receiving device may be increased since the transmitting device may have access to more transmission opportunities in the repetition window for transmitting the transport block (e.g., the transmitting device may not miss transmission opportunities in the repetition window).

Aspects of the disclosure introduced above are described below in the context of a wireless communications system. Examples of processes and signaling exchanges that support repetition-based transmissions are then described. Aspects of the disclosure are further illustrated by and described with reference to apparatus diagrams, system diagrams, and flowcharts that relate to repetition-based transmissions.

FIG. 1 illustrates an example of a wireless communications system 100 that supports repetition-based transmissions in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals of a communications resource in LTE or NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of sTTIs or in selected component carriers using sTTIs).

The numerology employed within wireless communications system 100 (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

In some cases, a transmitting device (e.g., a base station 105 or a UE 115) may be configured to transmit a transport block in a set of TTIs of a repetition window to increase the chances that the transport block is received by a receiving device. In such cases, the transmitting device may be configured with a redundancy version sequence for transmitting the transport block in each TTI of the repetition window. Each value in the redundancy version sequence may correspond to a particular TTI in the repetition window and may indicate the redundancy version of the transport block (i.e., the combination of systematic and parity bits) to be transmitted in the particular TTI.

For example, for a repetition window of length K, a transmitting device may be configured with a redundancy version sequence of length K (e.g., 0, 3, 0, 3) that indicates the redundancy version to be transmitted in each TTI of the repetition window. In some wireless communications systems, when a transmitting device is configured for repetition-based transmissions of a transport block, the transport block may only be initially transmitted in a TTI of a repetition window if the redundancy version corresponding to that TTI is zero (i.e., the transport block may only be initially transmitted with a redundancy version of zero). As such, the first value in redundancy version sequences used for repetition-based transmissions in such wireless communications systems may be zero.

In some cases, however, a transport block may not be available for transmission until after a first TTI of a repetition window (e.g., the transport block may not be received from higher layers until after a first TTI of a repetition window). In such cases, if the redundancy version value corresponding to the TTI in which the transport block is available for transmission is equal to a non-zero value, a transmitting device may avoid transmitting the transport block in that TTI of the repetition window. Instead, the transmitting device may transmit the transport block in a subsequent TTI of the repetition window with a corresponding redundancy version value that is equal to zero. As a result, the latency associated with transmissions of the transport block may increase and the chances that the transport block is received by a receiving device may decrease since the transmitting device may miss one or more transmission opportunities in the repetition window. Wireless communications system 100 may support efficient techniques for limiting the latency and increasing the reliability associated with repetition-based transmissions.

Figure 2:
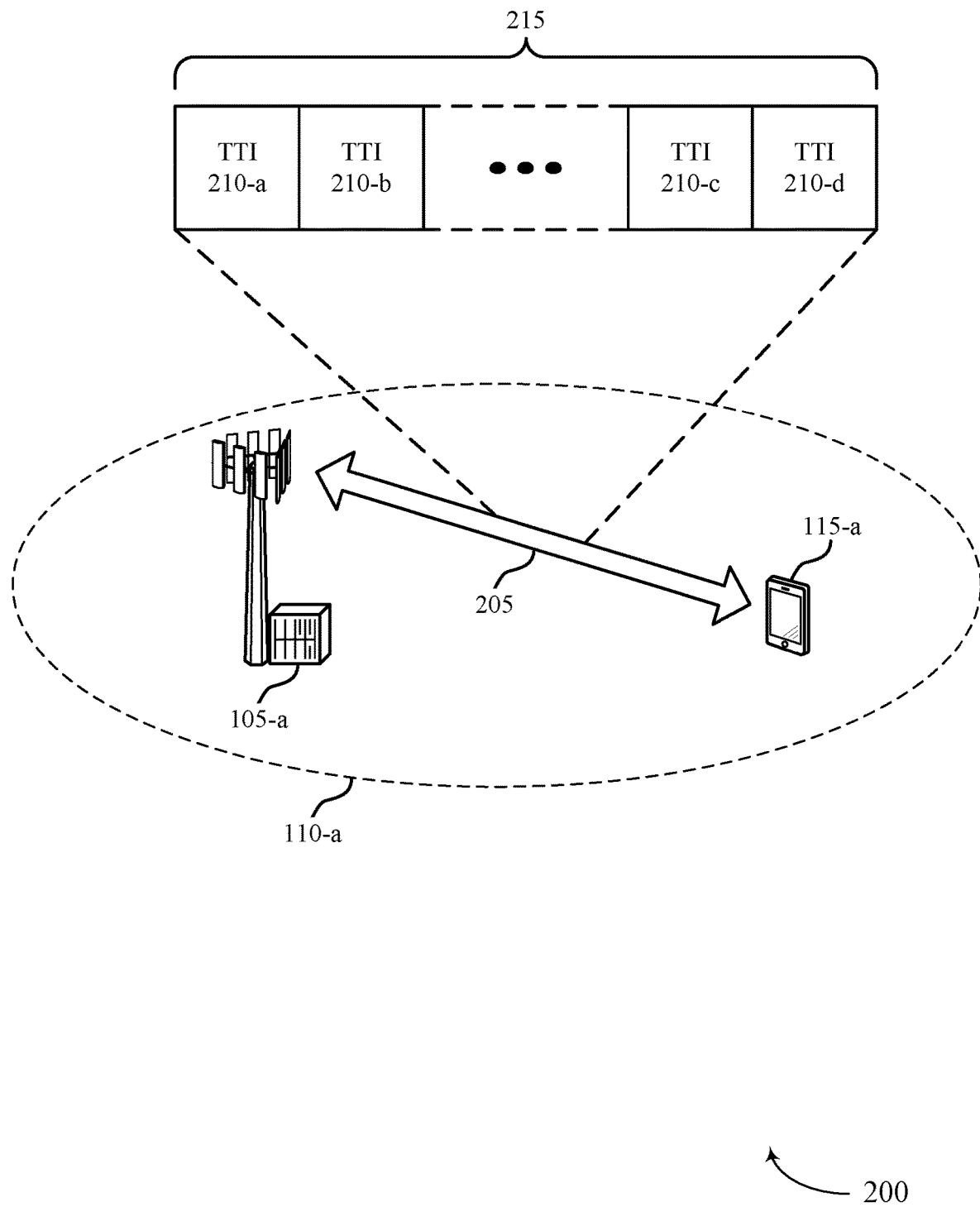

FIG. 2 illustrates an example of a wireless communications system 200 that supports repetition-based transmissions in accordance with aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205. Wireless communications system 200 may implement aspects of wireless communications system 100.

For example, wireless communications system 200 may support efficient techniques for limiting the latency and increasing the reliability associated with repetition-based transmissions.

In the example of FIG. 2, a transmitting device (e.g., base station 105-a or UE 115-a) may be configured to transmit a transport block in multiple TTIs 210 of a repetition window 215 to increase the chances that the transport block is received by a receiving device (e.g., for coverage enhancement). In this example, if the transmitting device determines that the transport block is available for transmission in a TTI following a first TTI of the repetition window (e.g., as opposed to being available for transmission in the first TTI of the repetition window), the transmitting device may transmit the transport block in the TTI in which the transport block is available for transmission (i.e., regardless of whether a redundancy version value corresponding to the TTI in which the transport block is available for transmission is equal to zero).

Figure 3:
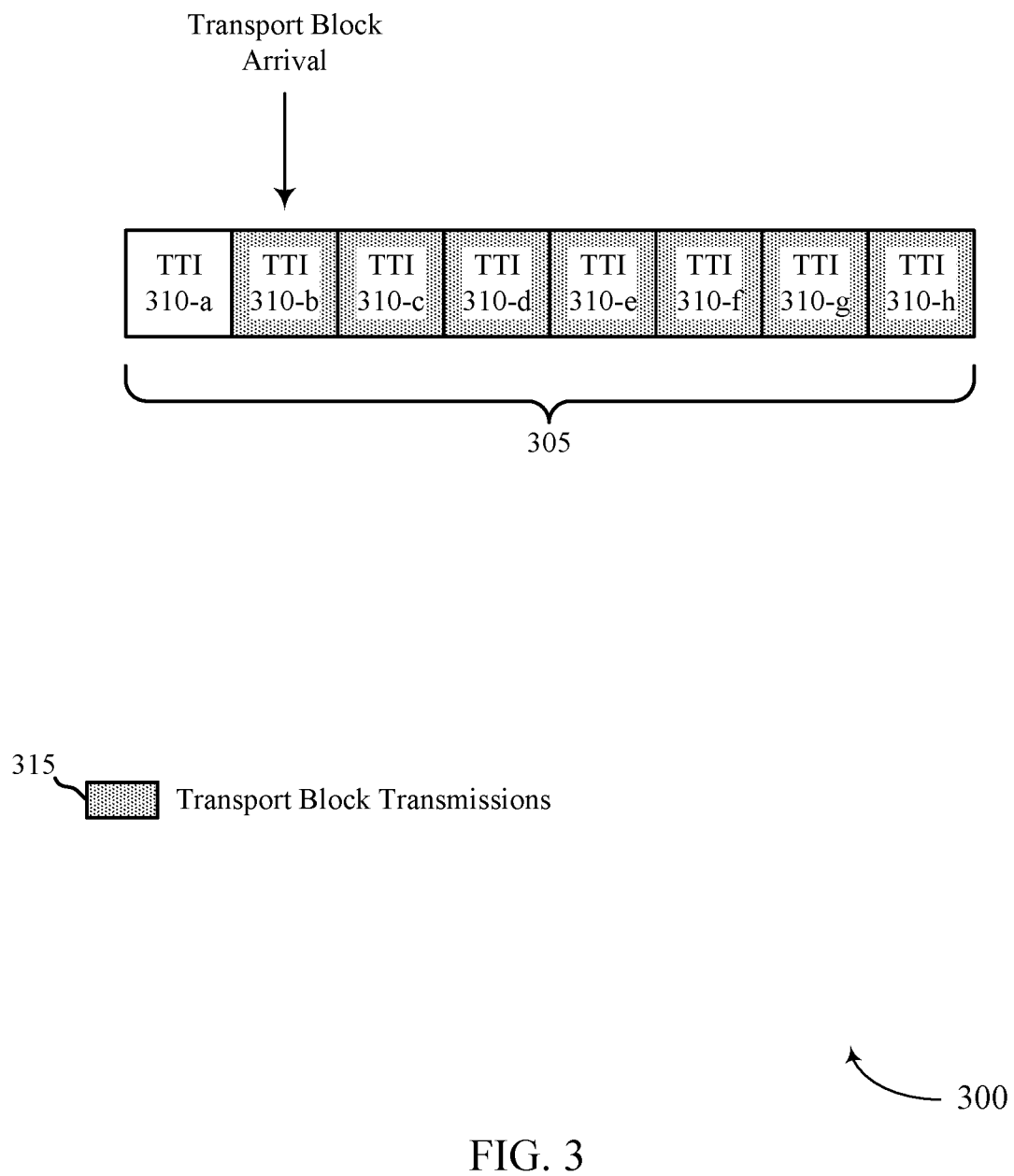
FIGS. 3 and 4 illustrate examples of repetition-based transmissions in accordance with aspects of the present disclosure.
Figure 4:
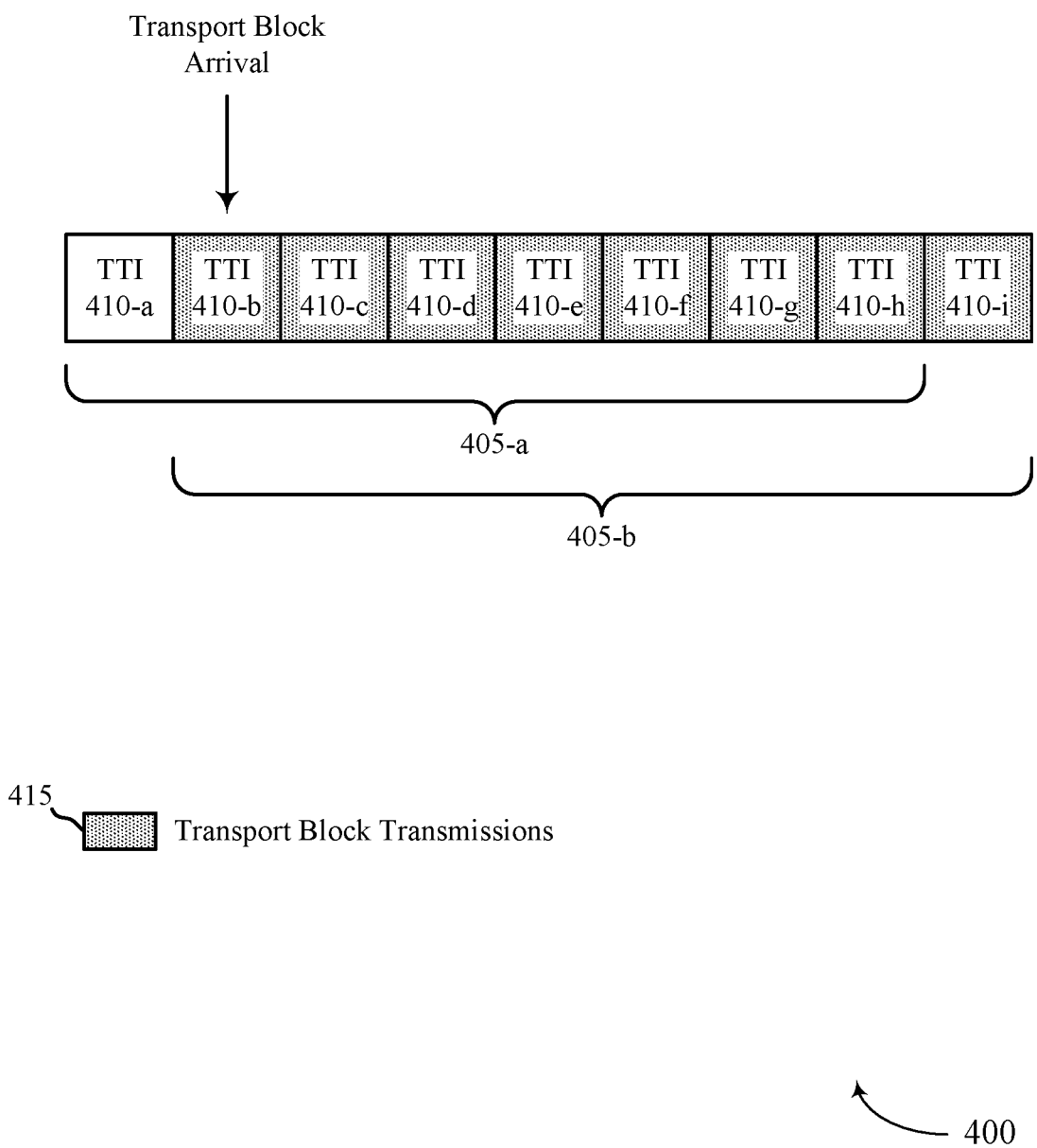

In addition, it may be appropriate for the transmitting device to determine suitable configurations for transmitting the transport block in the repetition window when a transport block is available to be transmitted in a TTI following a first TTI of the repetition window. FIGS. 3 and 4 illustrate examples of repetition-based transmissions in a repetition window, and the examples described below with reference to FIGS. 3 and 4 relate to techniques for identifying suitable configurations for the repetition-based transmissions. Although FIGS. 3 and 4 illustrate examples of repetition-based transmissions in a repetition window with a length of eight (i.e., including eight TTIs), it is to be understood that the techniques described herein can be used to identify suitable configurations for repetition-based transmissions in repetition windows having various lengths.

In the example of FIG. 3, a transmitting device may be configured to transmit a transport block in a repetition window 305 including multiple TTIs 310. Repetition window 305 may be a fixed repetition window (i.e., a repetition window including a fixed set of TTIs) and may be associated with a redundancy version sequence (i.e., an originally configured redundancy version sequence) that indicates the redundancy version of the transport block to be transmitted in each TTI of the repetition window.

In some cases, the transmitting device may identify that the transport block to be transmitted in repetition window 305 is available prior to the first TTI in the repetition window 305 (i.e., TTI 310-a) or during the first TTI in the repetition window 305. In such cases, the transmitting device may transmit the transport block in each TTI 310 of the repetition window according to the originally configured redundancy version sequence associated with the repetition window. In other cases, however, the transmitting device may identify that the transport block to be transmitted in repetition window 305 is available in a TTI (e.g., TTI 310-b) subsequent to the first TTI of the repetition window (e.g., TTI 310-a). In such cases, it may be appropriate for the transmitting device to identify an updated redundancy version sequence to use for transmissions of the transport block in the repetition window (i.e., transport block transmissions 315 in TTIs 310-b to 310-h).

In one example, the updated redundancy version sequence may be the same as a first portion of the originally configured redundancy version sequence. For instance, if the originally configured redundancy version sequence is {0, 3, 2, 1, 0, 3, 2, 1}, the updated redundancy version sequence may be {0, 3, 2, 1, 0, 3, 2}. In another example, the updated redundancy version sequence may be the same as a last portion of the originally configured redundancy version sequence. For instance, if the originally configured redundancy version sequence is {0, 3, 2, 1, 0, 3, 2, 1}, the updated redundancy version sequence may be {3, 2, 1, 0, 3, 2, 1}. In yet another example, the updated redundancy version sequence may be determined based on the index of the TTI in which the transport block is available for transmission, but may not include a portion of the originally configured redundancy version sequence (i.e., may be different from the sequences described in the examples above).

The particular technique used to derive the updated redundancy version sequence may be preconfigured or may be determined by base station 105-a and indicated to UE 115-a in an RRC message (e.g., as part of the repetition window configuration) or a downlink control information (DCI) message (e.g., the DCI used to activate the repetition-based transmissions). In any case, once the transmitting device identifies the updated redundancy version sequence, the transmitting device may transmit the transport block in the repetition window according to the updated redundancy version sequence.

In the example of FIG. 4, a transmitting device may be configured to transmit a transport block in a repetition window 405-a including multiple TTIs 410. Repetition window 405-a may be associated with a redundancy version sequence (i.e., an originally configured redundancy version sequence) that indicates the redundancy version of the transport block to be transmitted in each TTI of the repetition window.

In some cases, the transmitting device may identify that the transport block to be transmitted in repetition window 405-a is available prior to the first TTI in the repetition window 405 (i.e., TTI 410-a) or during the first TTI in the repetition window 405. In such cases, the transmitting device may transmit the transport block in each TTI 410 of the repetition window 405-a according to the redundancy version sequence associated with the repetition window. In other cases, however, the transmitting device may identify that the transport block to be transmitted in repetition window 405-a is available in a TTI (e.g., TTI 410-b) subsequent to the first TTI of the repetition window (e.g., TTI 410-a). In such cases, if the repetition window is a fixed repetition window, the transmitting device may have access to fewer TTIs in the repetition window (e.g., M TTIs) than was originally configured for repetition-based transmissions of the transport block (e.g., K TTIs, where M<K). As a result, the chances that the transport block is received by a receiving device may decrease.

As described with reference to FIG. 4, in order to increase the chances that a transport block is received by a receiving device, a transmitting device may utilize a sliding repetition window for repetition-based transmissions. That is, a transmitting device may adjust the repetition window to include the TTI in which the transport block is available to be transmitted as a first TTI in the repetition window. For instance, in the example of FIG. 4, the transmitting device may determine that the transport block to be transmitted is available in a TTI (e.g., TTI 410-b) subsequent to the first TTI of the repetition window (e.g., TTI 410-a). Accordingly, the transmitting device may adjust the repetition window (i.e., shown as adjusted repetition window 405-b) to include the TTI in which the transport block is available for transmission (i.e., TTI 410-b) as a first TTI in the repetition window. The transmitting device may then transmit the transport block in TTIs 410 of the adjusted repetition window 405-b (i.e., transport block transmissions 415 in TTIs 410-b to 410-i).

Using the sliding repetition window, the chances that a transport block is received by a receiving device may be increased since the transmitting device may have access to more transmission opportunities for transmitting the transport block (e.g., when compared to using a fixed repetition window). Further, the transmitting device may utilize the originally configured redundancy version sequence for transmissions in the sliding repetition window since the number of TTIs used for transmissions in adjusted repetition window 405-b may be the same as the number of TTIs originally configured for transmissions in repetition window 405-a.

Once a receiving device receives a transport block in a TTI, the receiving device may process the transport block to identify the information included in the transport block. In this example, however, since the sliding repetition window may span a varying set of TTIs, it may be challenging for a receiving device to determine the repetition window associated with a received transport block such that the receiving device may be able to combine the transport blocks within the repetition window. As such, the receiving device may support techniques for determining whether a transport block was transmitted in a first repetition window or a second repetition window to determine which transport blocks to combine during decoding. For instance, the receiving device may compare a transport block received in a particular TTI to transport blocks received in adjacent TTIs to determine which transport blocks to combine during decoding.

Figure 5:
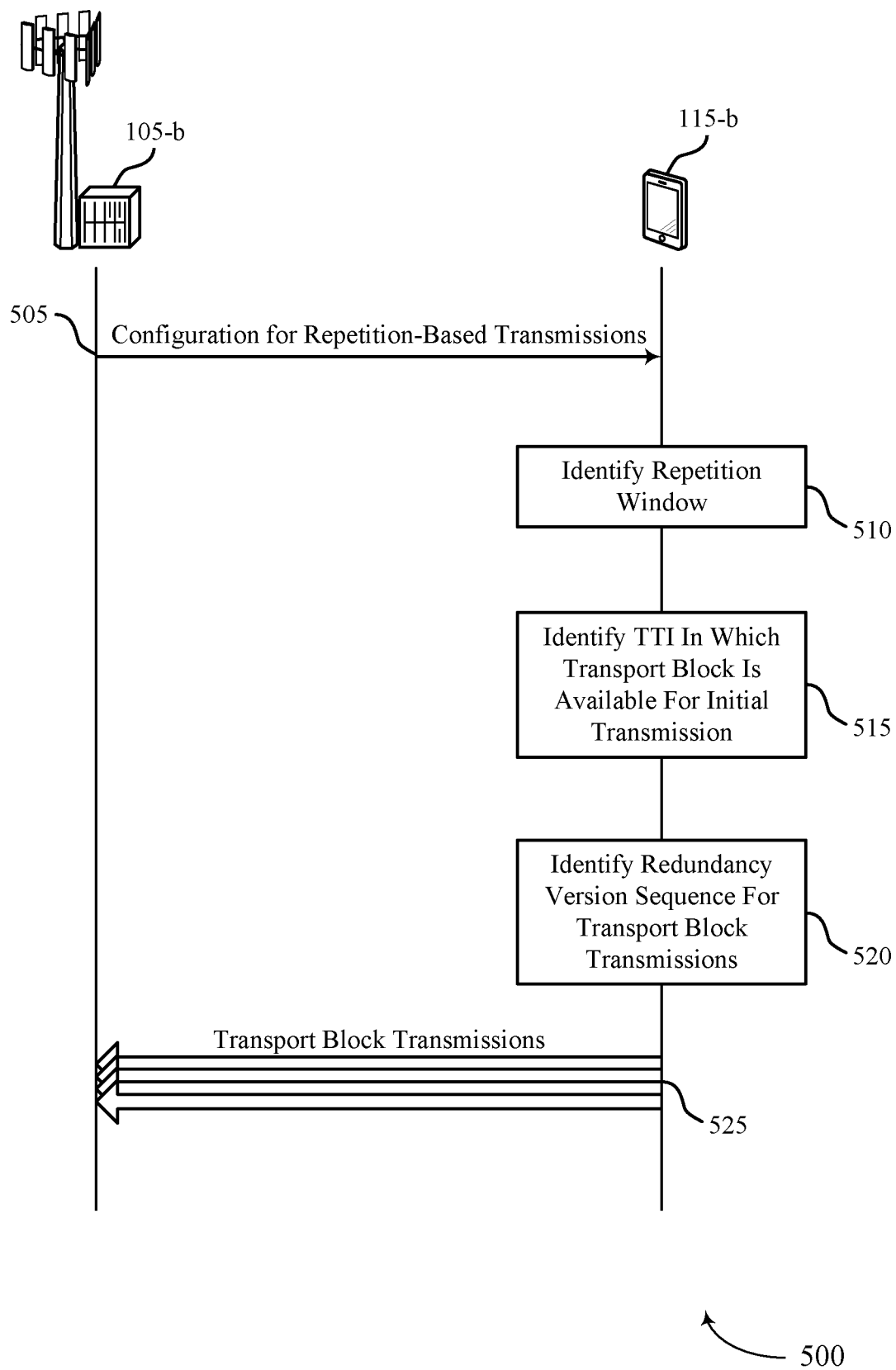
FIG. 5 illustrates an example of a process flow that supports repetition-based transmissions in accordance with aspects of the present disclosure.

FIG. 5 illustrates an example of a process flow 500 that supports repetition-based transmissions in accordance with aspects of the present disclosure. Process flow 500 illustrates aspects of techniques performed by a base station 105-b, which may be an example of a base station 105 described with reference to FIGS. 1-4. Process flow 500 also illustrates aspects of techniques performed by a UE 115-b, which may be an example of a UE 115 described with reference to FIGS. 1-4. Although the example described with reference to FIG. 5 is related to uplink transmissions of a transport block in a repetition window, it is to be understood that the techniques described herein are also applicable to downlink transmissions of a transport block in a repetition window.

At 505, base station 105-b may transmit a configuration to UE 115-b for repetition-based transmissions of a transport block. That is, the base station 105-b may configure UE 115-b to transmit a transport block in a repetition window to improve the chances that the transport block is received by base station 105-b. The base station 105-b may configure UE 115-b with a first redundancy version sequence to use for the transmissions of the transport block in the repetition window. At 510, UE 115-b may identify the repetition window in which to transmit the transport block to base station 105-b. At 515, UE 115-b may identify a TTI in which the transport block is available for initial transmission, and UE 115-b may determine that the TTI in which the transport block is available for initial transmission is subsequent to a first TTI of the configured repetition window. Accordingly, UE 115-b may use the techniques described herein for determining appropriate configurations for transmitting the transport block in the repetition window to base station 105-b.

In one example, at 520, UE 115-b may identify a second redundancy version sequence for transmitting the transport block in the repetition window (e.g., for a fixed repetition window). In this example, UE 115-b may transmit the transport block in the TTI in which the transport block is available for transmission regardless of a redundancy version value in the first redundancy version sequence that corresponds to the TTI in which the transport block is available for transmission (i.e., regardless of whether the redundancy version value is a zero or non-zero value). As such, the latency associated with transmissions of the transport block in the repetition window may be reduced. In some cases, the second redundancy version sequence may be the same as a first portion of the first redundancy version sequence. For instance, the second redundancy version sequence may be the same as the first redundancy version sequence (or the first portion of the first redundancy version sequence), but the second redundancy version sequence may start in the TTI in which the transport block is available for transmission and end in the last TTI of the repetition window (i.e., UE 115-b may apply the second redundancy version sequence (which may be the same as the first redundancy version sequence) to the TTI in which the transport block is available for transmission and subsequent TTIs in the repetition window). In other cases, the second redundancy version sequence may be the same as a last portion of the first redundancy version sequence, where a first value in the second redundancy version sequence comprises either a zero value or a non-zero value. In both cases, the second redundancy version sequence may end with a same TTI as the first redundancy version sequence (e.g., the second redundancy version sequence may be a shifted version of the first redundancy version sequence, where the shift may be based on the subsequent TTI in which the transport block is available for initial transmission).

In another example (not shown), UE 115-b may adjust the repetition window to include the TTI in which the transport block is available to be initially transmitted as an initial TTI for the repetition window so that the transport block is initially transmitted in the TTI. In this example, UE 115-b may use the first redundancy version sequence configured for the repetition window for transmitting the transport block in the repetition window. The repetition window may be referred to as a sliding repetition window since the TTIs included in the repetition window may be adjusted based on the TTI in which the transport block is available to be transmitted. When a sliding repetition window of length K is used for repetition-based transmissions of a transport block, UE 115-b may be able to transmit the transport block K times regardless of whether the transport block is available for transmission in a first TTI of an originally configured repetition window (i.e., since the repetition window can be adjusted).

Once UE 115-b identifies appropriate configurations for transmitting a transport block in a repetition window (e.g., an appropriate redundancy version sequence), and UE 115-b identifies the TTIs within the repetition window in which to transmit the transport block (e.g., based on receiving an indication of the first TTI in the repetition window or an indication of all TTIs in the repetition window), UE 115-b may identify the resources (e.g., frequency resources) to use for transmitting the transport block in the repetition window. In some examples, UE 115-b may identify a same set of resources for transmitting the transport block in each TTI of the repetition window. In other examples, UE 115-b may identify different sets of resources for transmitting the transport block in at least two TTIs of the repetition window.

In some cases, UE 115-b may receive an indication of the resources on which to transmit the transport block in each TTI of the repetition window. In one example, base station 105-b may provide an indication of the resources for UE 115-b to use to transmit the transport block in each TTI of the repetition window. In this example, UE 115-b may identify the resources to use to transmit the transport block in each TTI of the repetition window based on the indication. In another example, base station 105-*b* may provide an indication of the resources for UE 115-*b* to use to transmit the transport block in the first TTI of the repetition window. In this example, UE 115-*b* may identify the resources to use to transmit the transport block in the first TTI of the repetition window based on the indication, and UE 115-*b* may determine the resources to use for a transmission of the transport block in a subsequent TTI of the repetition window based on the resources allocated for the transmission of the transport block in the first TTI of the repetition window (e.g., the resources (e.g., frequency resources) to use for a transmission of the transport block in a subsequent TTI of the repetition window may be the same as the resources (e.g., frequency resources) to use to transmit the transport block in the first TTI).

For example, UE 115-*b* may determine the resources to use for a transmission of the transport block in a subsequent TTI of the repetition window based on an index of the first TTI allocated for the transmission of the transport block in the repetition window. Accordingly, if UE 115-*b* misses the initial transmission of the transport block in the first TTI, the UE 115-*b* will still be able to identify resources for subsequent transmissions of the transport block in subsequent TTIs of the repetition window. In some cases, UE 115-*b* may also determine the resources to use for the transmission of the transport block in the subsequent TTI based on an index of the TTI allocated for the subsequent transmission (e.g., the index in the repetition window) or based on an index of the subsequent transmission (e.g., whether the subsequent transmission is a first retransmission of the transport block, second retransmission of the transport block, etc.).

In some aspects, the different resources used for the transmissions of the transport block across TTIs within a repetition window may correspond to a frequency hopping pattern. The frequency hopping pattern may be dynamically determined by UE 115-*b* (as described above), or the frequency hopping pattern may be preconfigured and may be indicated to UE 115-*b* prior to a transmission in a repetition window. In some cases, the frequency hopping pattern may be configured for transmissions in a repetition window when certain conditions are satisfied. For example, the frequency hopping pattern may be enabled or disabled based on a length of a repetition window. Specifically, the frequency hopping pattern may be configured for transmissions in a repetition window when a length of the repetition window (i.e., a number of TTIs in which a UE 115-*b* is configured to transmit the transport block) is above or equal to a threshold (i.e., K≥X). In such cases, UE 115-*b* may determine whether the frequency hopping pattern is configured for transmissions within the repetition window based on a length of the repetition window. At 525, once UE 115-*b* identifies the resources on which to transmit the transport block in the repetition window, UE 115-*b* may transmit the transport block on the identified resources.

Figure 6:
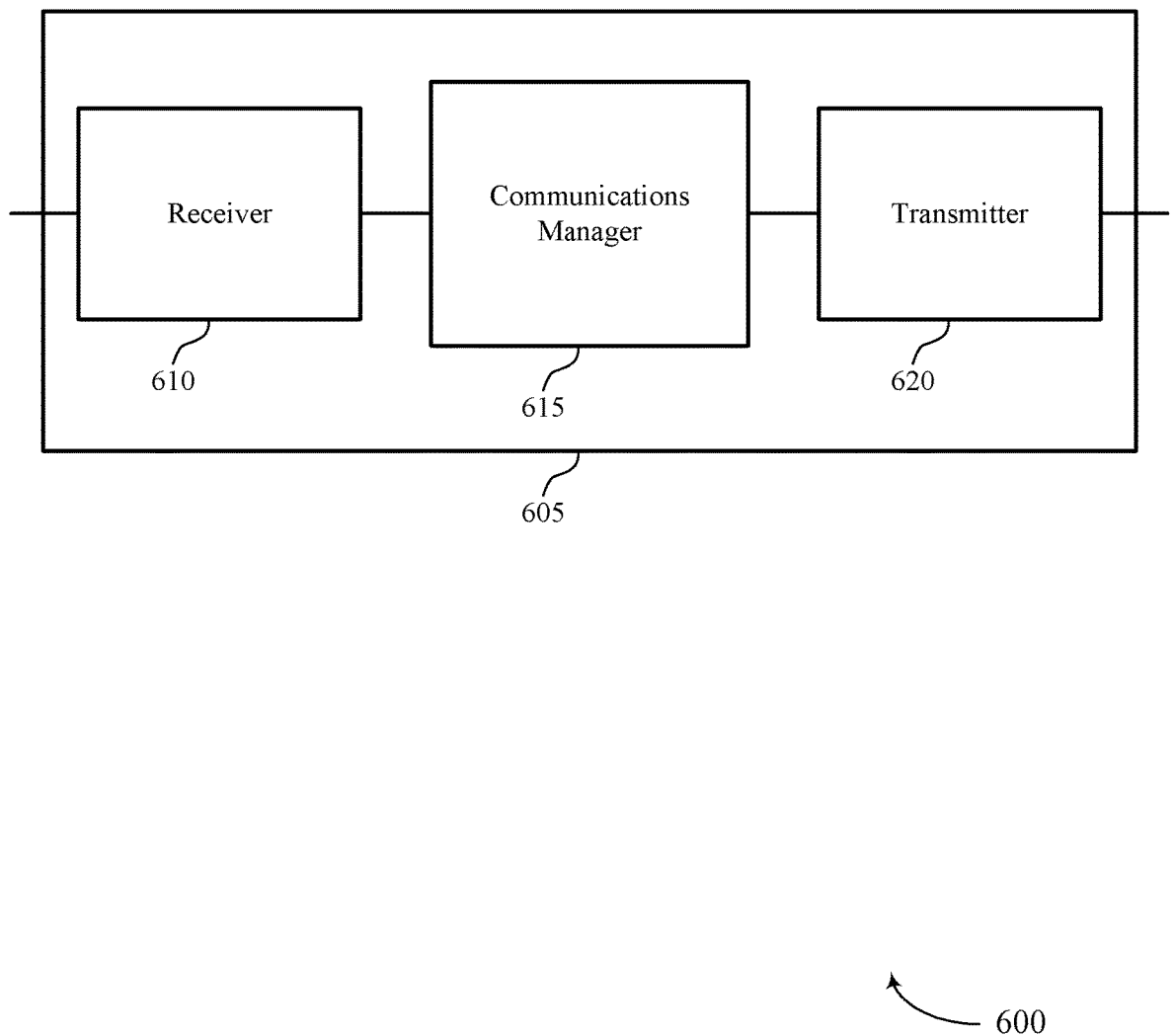
FIGS. 6-8 show block diagrams of a device that supports repetition-based transmissions in accordance with aspects of the present disclosure.

FIG. 6 shows a block diagram 600 of a wireless device 605 that supports repetition-based transmissions in accordance with aspects of the present disclosure. Wireless device 605 may be an example of aspects of a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to repetition-based transmissions, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may identify that a wireless device is configured for repetition-based transmission of a transport block within a repetition window, the repetition window including a first TTI and subsequent TTIs and being associated with a first redundancy version sequence, determine that the transport block is available for initial transmission in one of the subsequent TTIs of the repetition window, and determine a second redundancy version sequence for transmitting the transport block within the repetition window based on the transport block being available for initial transmission in one of the subsequent TTIs. Communications manager 615 may then coordinate with transmitter 620 to transmit the transport block within the repetition window in accordance with the second redundancy version sequence.

The communications manager 615 may also identify that a transport block is configured for repetition-based transmission, identify a TTI in which the transport block is available to be initially transmitted, and adjust a sliding repetition window to include the TTI as an initial TTI for the sliding repetition window so that the transport block is initially transmitted in the TTI, the sliding repetition window having an associated redundancy version sequence. Communications manager 615 may then coordinate with transmitter 620 to transmit the transport block within the sliding repetition window in accordance with the associated redundancy version sequence.

Transmitter 620 may transmit signals generated by other components of the device. In some examples, the transmitter

620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
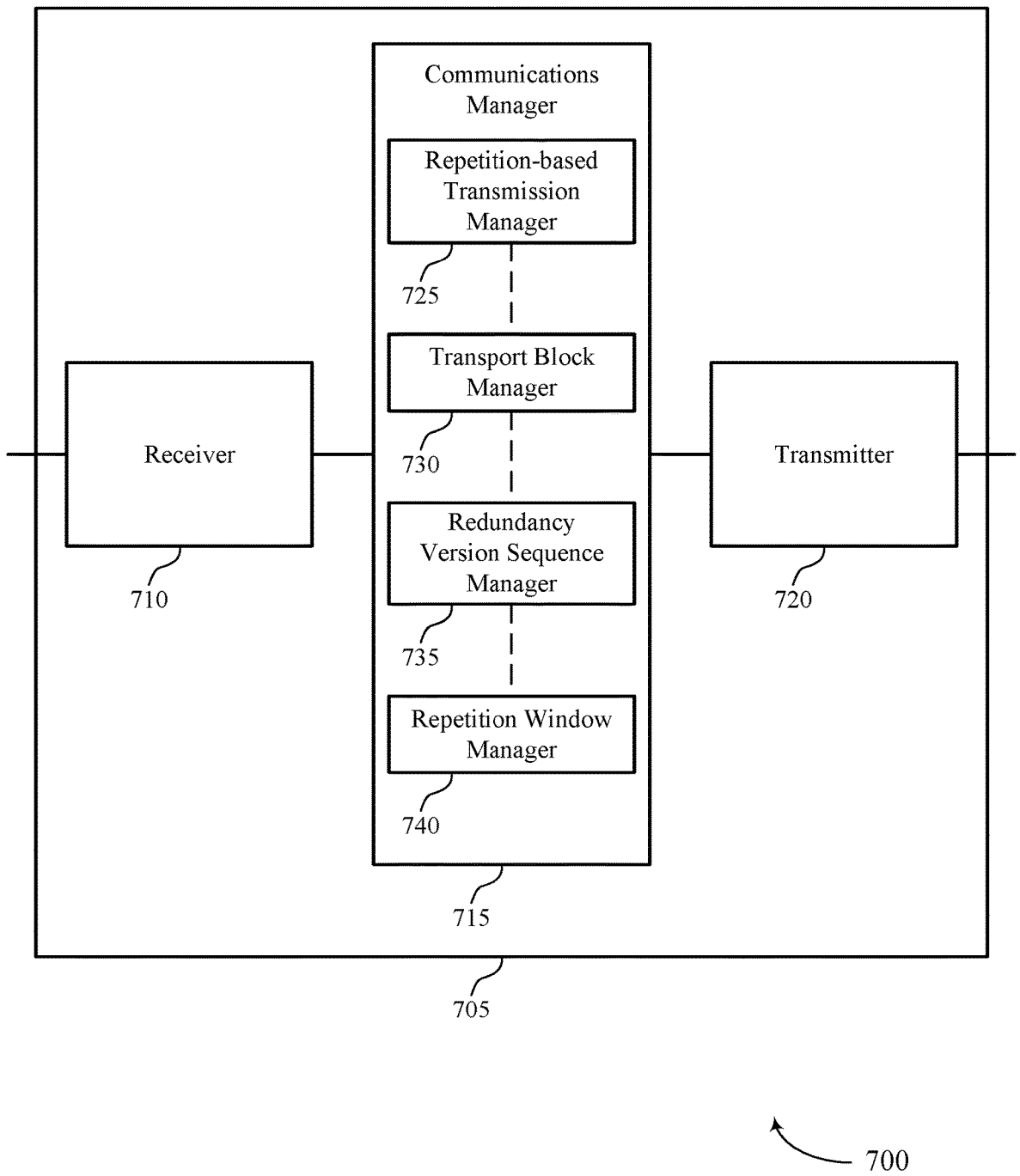

FIG. 7 shows a block diagram 700 of a wireless device 705 that supports repetition-based transmissions in accordance with aspects of the present disclosure. Wireless device 705 may be an example of aspects of a wireless device 605 or a UE 115 or base station 105 as described with reference to FIG. 6. Wireless device 705 may include receiver 710, communications manager 715, and transmitter 720. Communications manager 715 may include repetition-based transmission manager 725, transport block manager 730, redundancy version sequence manager 735, and repetition window manager 740. Communications manager 715 may be an example of aspects of the communications manager 915 described with reference to FIG. 9. Wireless device 705 may also include a processor. Each of these components may be in communication with one another (e.g., via one or more buses).

Receiver 710 may receive information such as packets, user data, or control information associated with various information channels (e.g., control channels, data channels, and information related to repetition-based transmissions, etc.). Information may be passed on to other components of the device. The receiver 710 may be an example of aspects of the transceiver 935 described with reference to FIG. 9. The receiver 710 may utilize a single antenna or a set of antennas.

In some aspects, repetition-based transmission manager 725 may identify that a wireless device is configured for repetition-based transmission of a transport block within a repetition window, the repetition window including a first TTI and subsequent TTIs and being associated with a first redundancy version sequence. Transport block manager 730 may determine that the transport block is available for initial transmission in one of the subsequent TTIs of the repetition window. Redundancy version sequence manager 735 may determine a second redundancy version sequence for transmitting the transport block within the repetition window based on the transport block being available for initial transmission in one of the subsequent TTIs. Communications manager 715 may then coordinate with transmitter 720 to transmit the transport block within the repetition window in accordance with the second redundancy version sequence.

In other aspects, repetition-based transmission manager 725 may identify that a transport block is configured for repetition-based transmission. Transport block manager 730 may identify a TTI in which the transport block is available to be initially transmitted. Repetition window manager 740 may adjust a sliding repetition window to include the TTI as an initial TTI for the sliding repetition window so that the transport block is initially transmitted in the TTI, the sliding repetition window having an associated redundancy version sequence. Communications manager 715 may then coordinate with transmitter 720 to transmit the transport block within the sliding repetition window in accordance with the associated redundancy version sequence.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
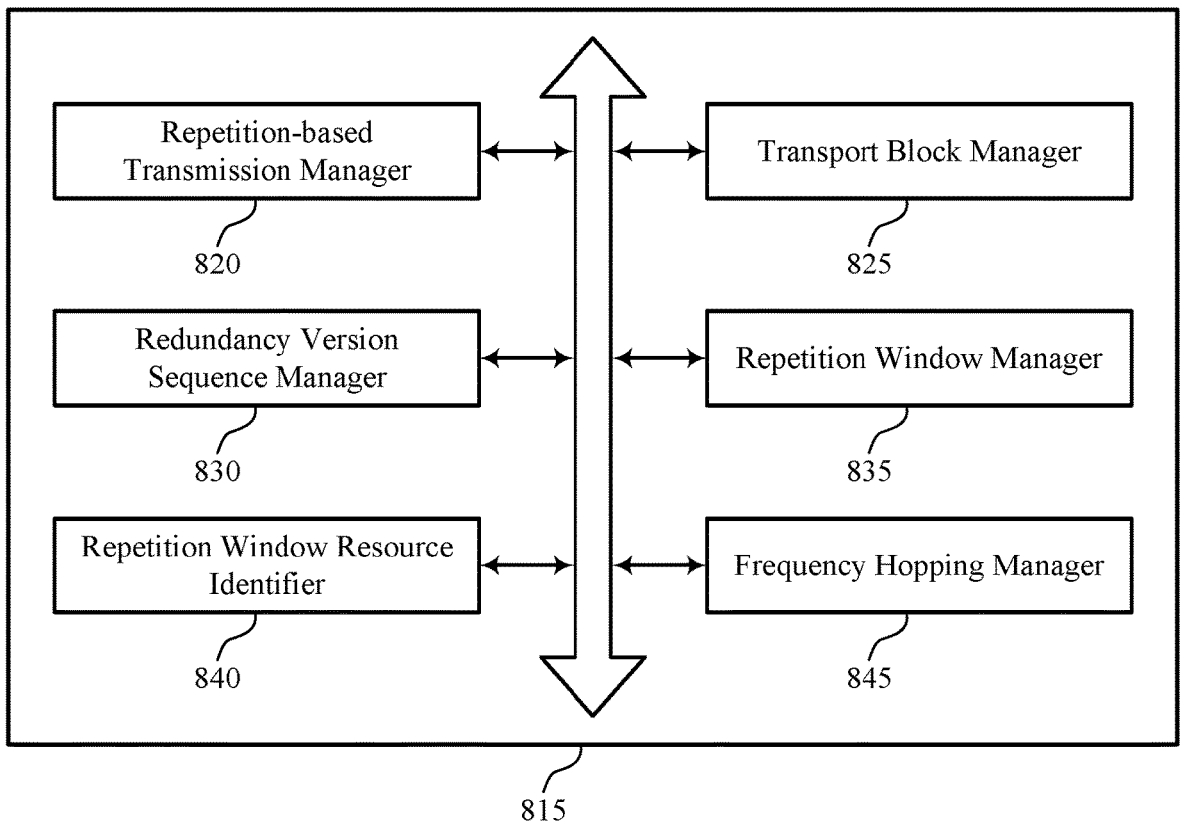

FIG. 8 shows a block diagram 800 of a communications manager 815 that supports repetition-based transmissions in accordance with aspects of the present disclosure. The communications manager 815 may be an example of aspects of a communications manager 615, a communications manager 715, or a communications manager 915 described with reference to FIGS. 6, 7, and 9. The communications manager 815 may include repetition-based transmission manager 820, transport block manager 825, redundancy version sequence manager 830, repetition window manager 835, repetition window resource identifier 840, and frequency hopping manager 845. Each of these modules may communicate, directly or indirectly, with one another (e.g., via one or more buses).

In some aspects, repetition-based transmission manager 820 may identify that a wireless device is configured for repetition-based transmission of a transport block within a repetition window, the repetition window including a first TTI and subsequent TTIs and being associated with a first redundancy version sequence. In some cases, the repetition window may be a fixed or preconfigured repetition window. Transport block manager 825 may determine that the transport block is available for initial transmission in one of the subsequent TTIs of the repetition window. Redundancy version sequence manager 830 may determine a second redundancy version sequence for transmitting the transport block within the repetition window based on the transport block being available for initial transmission in one of the subsequent TTIs. Communications manager 815 may then coordinate with a transmitter to transmit the transport block within the repetition window in accordance with the second redundancy version sequence. In some cases, the transport block may be transmitted in the one of the subsequent TTIs of the repetition window in which the transport block is available to be initially transmitted regardless of a value in the first redundancy version sequence corresponding to the one of the subsequent TTIs of the repetition window.

In some cases, determining the second redundancy version sequence includes identifying that the second redundancy version sequence is the same as a first portion of the first redundancy version sequence, where the second redundancy version sequence ends with a same TTI as the first redundancy version sequence. In some cases, determining the second redundancy version sequence includes identifying that the second redundancy version sequence is the same as a last portion of the first redundancy version sequence, where a first value in the second redundancy version sequence includes either a zero value or a non-zero value, and where the second redundancy version sequence ends with a same TTI as the first redundancy version sequence. In some cases, the second redundancy version sequence is based on an index of the one of the subsequent TTIs in which the transport block is available to be initially transmitted. In some cases, determining the second redundancy version sequence includes receiving an indication of the second redundancy version sequence. In some cases, the indication of the second redundancy version sequence is received in a RRC message or a DCI message.

In other aspects, repetition-based transmission manager 820 may identify that a transport block is configured for repetition-based transmission. Transport block manager 825 may identify a TTI in which the transport block is available to be initially transmitted. Repetition window manager 835 may adjust a sliding repetition window to include the TTI as an initial TTI for the sliding repetition window so that the transport block is initially transmitted in the TTI, the sliding repetition window having an associated redundancy version sequence. Communications manager 815 may then coordinate with a transmitter to transmit the transport block within the sliding repetition window in accordance with the associated redundancy version sequence.

In some cases, repetition window resource identifier 840 may identify a same set of resources for transmitting the transport block in each TTI of the repetition window (e.g., the fixed repetition window or the sliding repetition window). In some cases, repetition window resource identifier 840 may identify a first set of resources for transmitting the transport block in one TTI of the repetition window (e.g., the fixed repetition window or the sliding repetition window) and identify a second set of resources for transmitting the transport block in another TTI of the repetition window. In some cases, repetition window resource identifier 840 may receive an indication of resources for transmitting the transport block within the repetition window.

In some cases, receiving the indication of the resources for transmitting the transport block within the repetition window includes receiving an indication of resources allocated for the initial transmission of the transport block within the repetition window and determining the resources for a subsequent transmission of the transport block within the repetition window based on the resources allocated for the initial transmission of the transport block within the repetition window. In some cases, determining the resources for the subsequent transmission of the transport block includes determining the resources for the subsequent transmission of the transport block based on an index of a TTI in which the initial transmission of the transport block occurs within the repetition window. In some cases, the determining the resources for the subsequent transmission of the transport block is further based on an index of a TTI in which the subsequent transmission occurs within the repetition window or on an index of the subsequent transmission in a series of repetition-based transmissions. In some cases, the indication of the resources for transmitting the transport block within the repetition window is received in an RRC message or a DCI message. Once repetition window resource identifier 840 identifies the resources for transmitting the transport block in the repetition window, communications manager 815 may coordinate with a transmitter to transmit the transport block on the identified resources.

In some cases, the transport block is transmitted within the repetition window (e.g., the fixed repetition window or the sliding repetition window) according to a frequency hopping pattern. Frequency hopping manager 845 may determine whether the frequency hopping pattern is configured for transmissions of the transport block within the repetition window based on a length of the repetition window.

Figure 9:
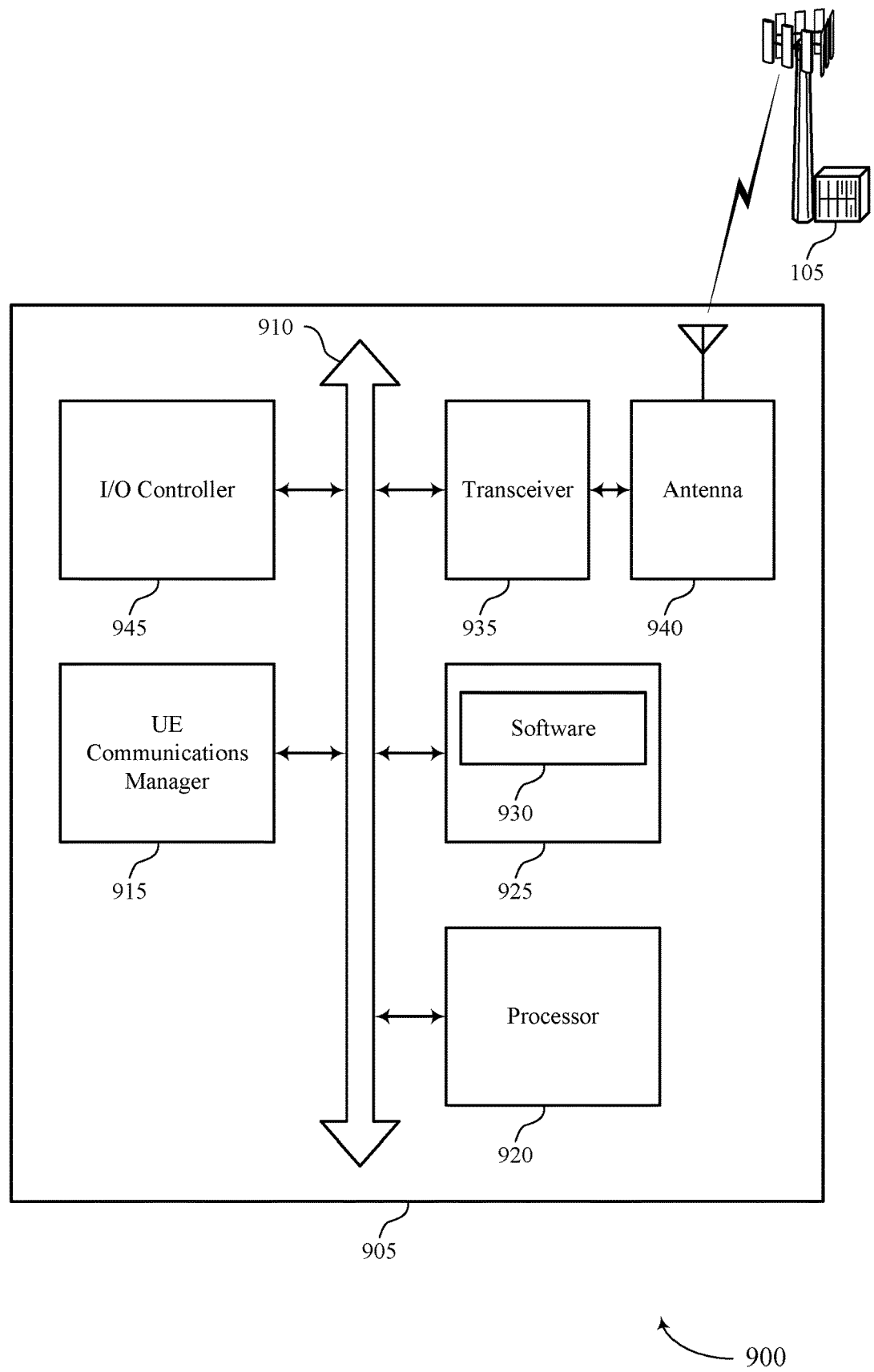
FIG. 9 illustrates a block diagram of a system including a user equipment (UE) that supports repetition-based transmissions in accordance with aspects of the present disclosure.

FIG. 9 shows a diagram of a system 900 including a device 905 that supports repetition-based transmissions in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting repetition-based transmissions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support repetition-based transmissions. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
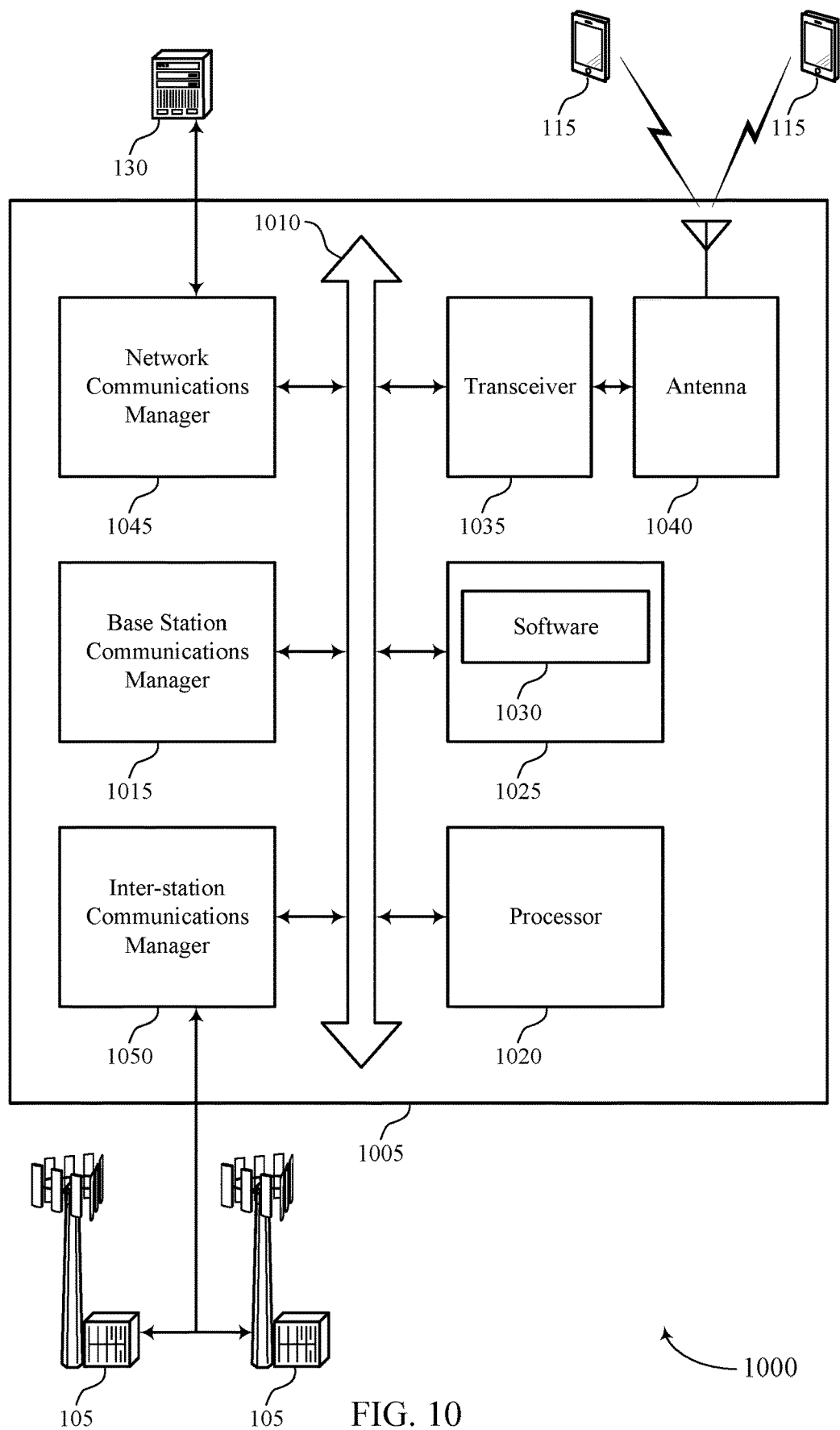
FIG. 10 illustrates a block diagram of a system including a base station that supports repetition-based transmissions in accordance with aspects of the present disclosure.

FIG. 10 shows a diagram of a system 1000 including a device 1005 that supports repetition-based transmissions in accordance with aspects of the present disclosure. Device 1005 may be an example of or include the components of wireless device 605, wireless device 705, or a base station 105 as described above, e.g., with reference to FIGS. 6 and 7. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting repetition-based transmissions).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support repetition-based transmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
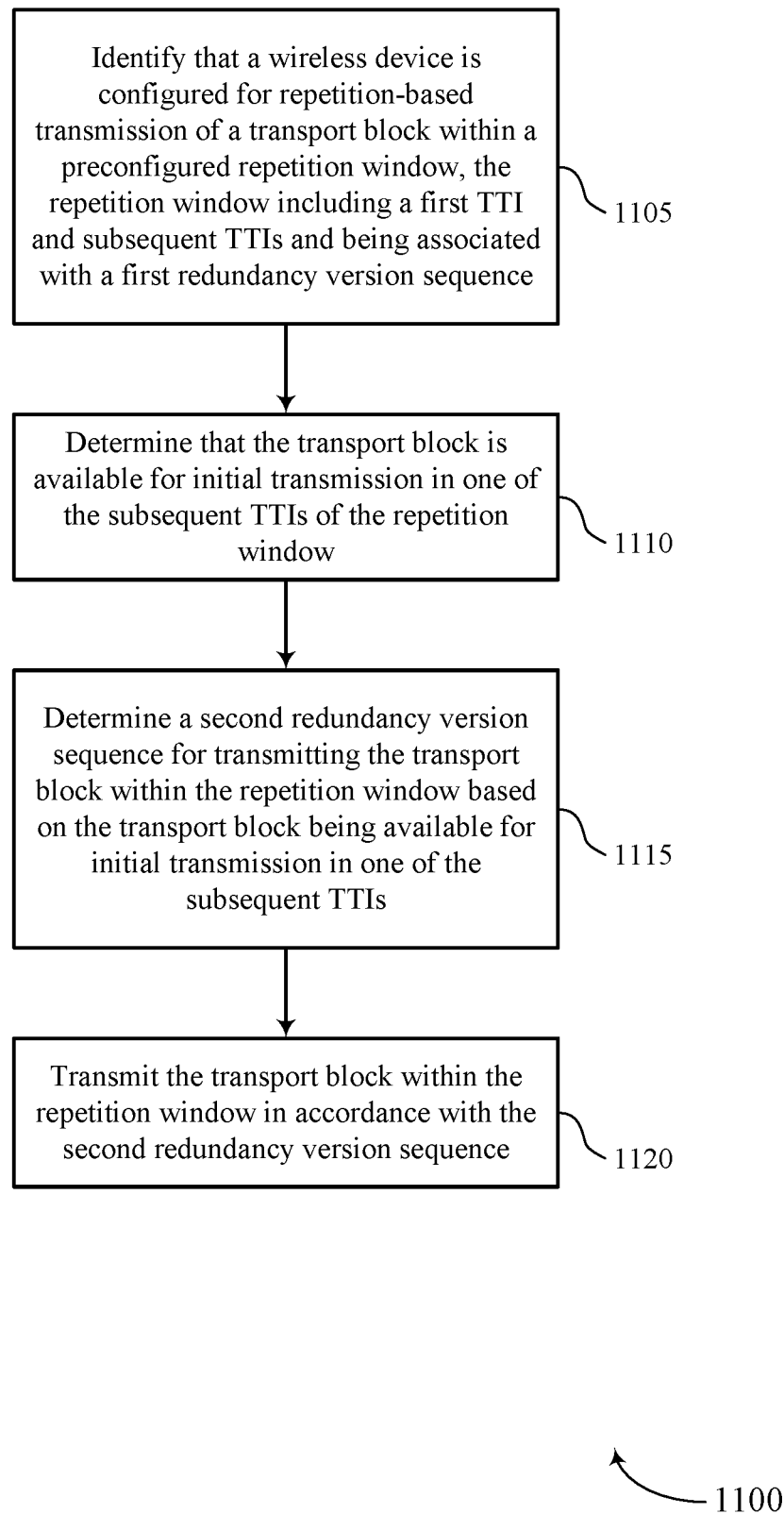
FIGS. 11 and 12 illustrate methods for repetition-based transmissions in accordance with aspects of the present disclosure.

FIG. 11 shows a flowchart illustrating a method 1100 for repetition-based transmissions in accordance with aspects of the present disclosure. The operations of method 1100 may be implemented by a UE 115 or base station 105 or its components as described herein. For example, the operations of method 1100 may be performed by a communications manager as described with reference to FIGS. 6 through 8. In some examples, a UE 115 or base station 105 may execute a set of codes to control the functional elements of the device to perform the functions described below. Additionally, or alternatively, the UE 115 or base station 105 may perform aspects of the functions described below using special-purpose hardware.

At 1105 the UE 115 or base station 105 may identify that a wireless device is configured for repetition-based transmission of a transport block within a repetition window, the repetition window including a first TTI and subsequent TTIs and being associated with a first redundancy version sequence. The operations of 1105 may be performed according to the methods described herein. In certain examples, aspects of the operations of 1105 may be performed by a repetition-based transmission manager as described with reference to FIGS. 6 through 8.

At 1110 the UE 115 or base station 105 may determine that the transport block is available for initial transmission in one of the subsequent TTIs of the repetition window. The operations of 1110 may be performed according to the methods described herein. In certain examples, aspects of the operations of 1110 may be performed by a transport block manager as described with reference to FIGS. 6 through 8.

At 1115 the UE 115 or base station 105 may determine a second redundancy version sequence for transmitting the transport block within the repetition window based at least in part on the transport block being available for initial transmission in one of the subsequent TTIs. The operations of 1115 may be performed according to the methods described herein. In certain examples, aspects of the operations of 1115 may be performed by a redundancy version sequence manager as described with reference to FIGS. 6 through 8.

At 1120 the UE 115 or base station 105 may transmit the transport block within the repetition window in accordance with the second redundancy version sequence. The operations of 1120 may be performed according to the methods described herein. In certain examples, aspects of the operations of 1120 may be performed by a transmitter as described with reference to FIGS. 6 through 8.

Figure 12:
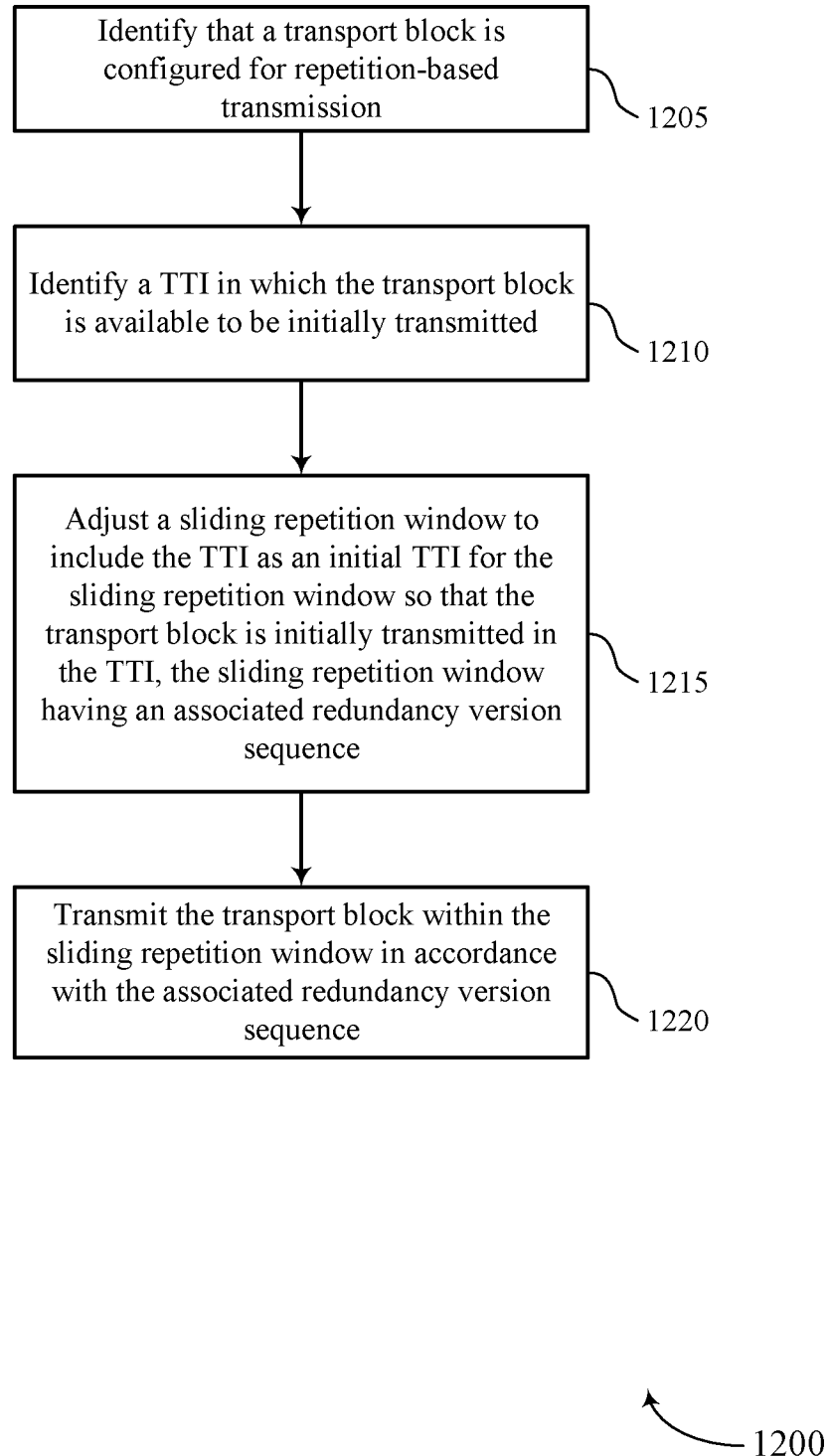

FIG. 12 shows a flowchart illustrating a method 1200 for repetition-based transmissions in accordance with aspects of the present disclosure. The operations of method 1200 may be implemented by a UE 115 or base station 105 or its components as described herein. For example, the operations of method 1200 may be performed by a communications manager as described with reference to FIGS. 6 through 8. In some examples, a UE 115 or base station 105 may execute a set of codes to control the functional elements of the device to perform the functions described below. Additionally, or alternatively, the UE 115 or base station 105 may perform aspects of the functions described below using special-purpose hardware.

At 1205 the UE 115 or base station 105 may identify that a transport block is configured for repetition-based transmission. The operations of 1205 may be performed according to the methods described herein. In certain examples, aspects of the operations of 1205 may be performed by a repetition-based transmission manager as described with reference to FIGS. 6 through 8.

At 1210 the UE 115 or base station 105 may identify a transmission time interval (TTI) in which the transport block is available to be initially transmitted. The operations of 1210 may be performed according to the methods described herein. In certain examples, aspects of the operations of 1210 may be performed by a transport block manager as described with reference to FIGS. 6 through 8.

At 1215 the UE 115 or base station 105 may adjust a sliding repetition window to include the TTI as an initial TTI for the sliding repetition window so that the transport block is initially transmitted in the TTI, the sliding repetition window having an associated redundancy version sequence. The operations of 1215 may be performed according to the methods described herein. In certain examples, aspects of the operations of 1215 may be performed by a repetition window manager as described with reference to FIGS. 6 through 8.

At 1220 the UE 115 or base station 105 may transmit the transport block within the sliding repetition window in accordance with the associated redundancy version sequence. The operations of 1220 may be performed according to the methods described herein. In certain examples, aspects of the operations of 1220 may be performed by a transmitter as described with reference to FIGS. 6 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying that a wireless device is configured for repetition-based transmission of a transport block within a repetition window, the repetition window including a first transmission time interval (TTI) and subsequent TTIs and being associated with a first redundancy version sequence;
    determining that the transport block is available for initial transmission in one of the subsequent TTIs of the repetition window;
    determining a second redundancy version sequence for transmitting the transport block within the repetition window based at least in part on the transport block being available for the initial transmission in one of the subsequent TTIs; and
    transmitting the transport block within the repetition window in accordance with the second redundancy version sequence.

2. The method of claim 1, wherein the second redundancy version sequence is based at least in part on an index of the one of the subsequent TTIs in which the transport block is available to be initially transmitted.

3. The method of claim 1, wherein determining the second redundancy version sequence comprises:
    identifying that the second redundancy version sequence is the same as a first portion of the first redundancy version sequence, wherein the second redundancy version sequence ends with a same TTI as the first redundancy version sequence.

4. The method of claim 1, wherein determining the second redundancy version sequence comprises:
    identifying that the second redundancy version sequence is the same as a last portion of the first redundancy version sequence, wherein a first value in the second redundancy version sequence comprises either a zero value or a non-zero value, and wherein the second redundancy version sequence ends with a same TTI as the first redundancy version sequence.

5. The method of claim 1, wherein determining the second redundancy version sequence comprises:
    receiving an indication of the second redundancy version sequence.

6. The method of claim 1, wherein the transport block is transmitted in the one of the subsequent TTIs of the repetition window in which the transport block is available to be initially transmitted regardless of a value in the first redundancy version sequence corresponding to the one of the subsequent TTIs of the repetition window.

7. The method of claim 1, further comprising:
    identifying a same set of resources for transmitting the transport block in each TTI of the repetition window; and
    transmitting the transport block within the repetition window on the identified resources.

8. The method of claim 1, further comprising:
    identifying a first set of resources for transmitting the transport block in one TTI of the repetition window;

identifying a second set of resources for transmitting the transport block in another TTI of the repetition window; and transmitting the transport block within the repetition window on the identified resources.

9. The method of claim 1, further comprising:

receiving an indication of resources for transmitting the transport block within the repetition window.

10. The method of claim 9, wherein receiving the indication of the resources for transmitting the transport block within the repetition window comprises:

receiving an indication of resources allocated for the initial transmission of the transport block within the repetition window; and determining the resources for a subsequent transmission of the transport block within the repetition window based at least in part on the resources allocated for the initial transmission of the transport block within the repetition window.

11. The method of claim 10, wherein determining the resources for the subsequent transmission of the transport block comprises:

determining the resources for the subsequent transmission of the transport block based on an index of a TTI in which the initial transmission of the transport block occurs within the repetition window.

12. The method of claim 10, wherein the determining the resources for the subsequent transmission of the transport block is further based at least in part on an index of a TTI in which the subsequent transmission occurs within the repetition window or on an index of the subsequent transmission in a series of repetition-based transmissions.

13. The method of claim 1, wherein the transport block is transmitted within the repetition window according to a frequency hopping pattern.

14. The method of claim 13, further comprising:

determining whether the frequency hopping pattern is configured for transmissions of the transport block within the repetition window based at least in part on a length of the repetition window.

15. An apparatus for wireless communication, comprising:

a processor;

memory coupled with the processor; and instructions stored in the memory and executable by the processor to cause the apparatus to:

identify that a wireless device is configured for repetition-based transmission of a transport block within a preconfigured repetition window, the repetition window including a first transmission time interval (TTI) and subsequent TTIs and being associated with a first redundancy version sequence;

determine that the transport block is available for initial transmission in one of the subsequent TTIs of the repetition window;

determine a second redundancy version sequence for transmitting the transport block within the repetition window based at least in part on the transport block being available for the initial transmission in one of the subsequent TTIs; and transmit the transport block within the repetition window in accordance with the second redundancy version sequence.

16. The apparatus of claim 15, wherein the instructions to determine the second redundancy version sequence are executable by the processor to cause the apparatus to:

identify that the second redundancy version sequence is the same as a first portion of the first redundancy version sequence, wherein the second redundancy version sequence ends with a same TTI as the first redundancy version sequence.

17. The apparatus of claim 15, wherein the instructions to determine the second redundancy version sequence are executable by the processor to cause the apparatus to:

identify that the second redundancy version sequence is the same as a last portion of the first redundancy version sequence, wherein a first value in the second redundancy version sequence comprises either a zero value or a non-zero value, and wherein the second redundancy version sequence ends with a same TTI as the first redundancy version sequence.

18. The apparatus of claim 15, wherein the second redundancy version sequence is based at least in part on an index of the one of the subsequent TTIs in which the transport block is available to be initially transmitted.

19. The apparatus of claim 15, wherein the instructions to determine the second redundancy version sequence are executable by the processor to cause the apparatus to:

receive an indication of the second redundancy version sequence.

20. The apparatus of claim 15, wherein the transport block is transmitted in the one of the subsequent TTIs of the repetition window in which the transport block is available to be initially transmitted regardless of a value in the first redundancy version sequence corresponding to the one of the subsequent TTIs of the repetition window.

21. The apparatus of claim 15, wherein the instructions are further executable by the processor to cause the apparatus to:

identify a same set of resources for transmitting the transport block in each TTI of the repetition window; and transmit the transport block within the repetition window on the identified resources.

22. The apparatus of claim 15, wherein the instructions are further executable by the processor to cause the apparatus to:

identify a first set of resources for transmitting the transport block in one TTI of the repetition window;

identify a second set of resources for transmitting the transport block in another TTI of the repetition window; and transmit the transport block within the repetition window on the identified resources.

23. The apparatus of claim 15, wherein the instructions are further executable by the processor to cause the apparatus to:

receive an indication of resources for transmitting the transport block within the repetition window.

24. The apparatus of claim 23, wherein the instructions to receive the indication of the resources for transmitting the transport block within the repetition window are executable by the processor to cause the apparatus to:

receive an indication of resources allocated for the initial transmission of the transport block within the repetition window; and determine the resources for a subsequent transmission of the transport block within the repetition window based at least in part on the resources allocated for the initial transmission of the transport block within the repetition window.

25. The apparatus of claim 24, wherein the instructions to determine the resources for the subsequent transmission of the transport block are executable by the processor to cause the apparatus to:
  determine the resources for the subsequent transmission of the transport block based on an index of a TTI in which the initial transmission of the transport block occurs within the repetition window.

26. The apparatus of claim 24, wherein the determining the resources for the subsequent transmission of the transport block is further based at least in part on an index of a TTI in which the subsequent transmission occurs within the repetition window or on an index of the subsequent transmission in a series of repetition-based transmissions.

27. The apparatus of claim 15, wherein the transport block is transmitted within the repetition window according to a frequency hopping pattern.

28. The apparatus of claim 27, wherein the instructions are further executable by the processor to cause the apparatus to:
  determine whether the frequency hopping pattern is configured for transmissions of the transport block within the repetition window based at least in part on a length of the repetition window.

29. An apparatus for wireless communication, comprising:
  means for identifying that a wireless device is configured for repetition-based transmission of a transport block within a preconfigured repetition window, the repetition window including a first transmission time interval (TTI) and subsequent TTIs and being associated with a first redundancy version sequence;
  means for determining that the transport block is available for initial transmission in one of the subsequent TTIs of the repetition window;
  means for determining a second redundancy version sequence for transmitting the transport block within the repetition window based at least in part on the transport block being available for the initial transmission in one of the subsequent TTIs; and
  means for transmitting the transport block within the repetition window in accordance with the second redundancy version sequence.

30. A non-transitory computer-readable medium storing code for wireless communication, the code comprising instructions executable by a processor to:
  identify that a wireless device is configured for repetition-based transmission of a transport block within a preconfigured repetition window, the repetition window including a first transmission time interval (TTI) and subsequent TTIs and being associated with a first redundancy version sequence;
  determine that the transport block is available for initial transmission in one of the subsequent TTIs of the repetition window;
  determine a second redundancy version sequence for transmitting the transport block within the repetition window based at least in part on the transport block being available for the initial transmission in one of the subsequent TTIs; and
  transmit the transport block within the repetition window in accordance with the second redundancy version sequence.

* * * * *